United States Patent
O'Sullivan et al.

(10) Patent No.: US 10,714,923 B2
(45) Date of Patent: Jul. 14, 2020

(54) PROTECTION DEVICE

(71) Applicant: Analog Devices International Unlimited Company, Limerick (IE)

(72) Inventors: Paul O'Sullivan, San Jose, CA (US); Maurice O'Brien, Limerick (IE); Donal G. O'Sullivan, Ardnacrusha (IE)

(73) Assignee: Analog Devices Internatianal Unlimited Company, Limerick (IE)

(*) Notice: Subject to any disclaimer, the term of this patent is extended or adjusted under 35 U.S.C. 154(b) by 0 days.

(21) Appl. No.: 16/204,797

(22) Filed: Nov. 29, 2018

(65) Prior Publication Data
US 2020/0176969 A1    Jun. 4, 2020

(51) Int. Cl.
| H02H 3/10  | (2006.01) |
| H02H 3/027 | (2006.01) |
| G05F 1/573 | (2006.01) |
| G06F 1/30  | (2006.01) |
| H02H 9/02  | (2006.01) |
| H02H 9/04  | (2006.01) |
| G06F 1/28  | (2006.01) |
| G05F 1/571 | (2006.01) |
| H02M 3/38  | (2006.01) |
| G05F 1/56  | (2006.01) |

(52) U.S. Cl.
CPC ............ *H02H 3/105* (2013.01); *G05F 1/571* (2013.01); *G05F 1/573* (2013.01); *G06F 1/28* (2013.01); *G06F 1/30* (2013.01); *H02H 3/027* (2013.01); *H02H 9/025* (2013.01); *H02H 9/04* (2013.01); *G05F 1/562* (2013.01); *H02M 3/38* (2013.01)

(58) Field of Classification Search
CPC ........... G05F 1/562; G05F 1/573; H02M 3/38

USPC ...... 323/274, 276, 277; 361/93.1, 93.7, 102, 361/104
See application file for complete search history.

(56) References Cited

U.S. PATENT DOCUMENTS

| 5,164,874 | A   |    | 11/1992 | Okano et al.                |
| 6,049,144 | A   |    | 4/2000  | Banyas et al.               |
| 6,590,757 | B2  | *  | 7/2003  | Pahl ............... H02H 1/0015 361/93.2 |
| 6,914,416 | B2  |    | 7/2005  | Thomas et al.               |
| 7,538,519 | B2  | *  | 5/2009  | Daou ............... H02J 7/0031 320/116 |
| 8,284,528 | B2  | *  | 10/2012 | Koshin ............ H01H 9/548 335/201 |

(Continued)

OTHER PUBLICATIONS

"AND9009 D: Types of Electrical Overstress Protection", On Semiconductor Application Note, (2014), 11 pgs.

*Primary Examiner* — Gary A Nash
(74) *Attorney, Agent, or Firm* — Schwegman Lundberg & Woessner, P.A.

(57) ABSTRACT

In electronic systems, the downstream circuitry may be damaged by overcurrent and overvoltage events. Therefore, there is provided a dual protection device for protecting electrical components in electronic systems. The protection device includes a mechanical fuse in conjunction with an electronic fuse, eFuse, the two components connected in series, together protecting against overcurrent events on two levels. The mechanical fuse provides high overcurrent protection, realising fast and reliable protection at high overcurrent events, and the electronic fuse provides low overcurrent protection, realising accurate and resettable protection for low overcurrent events.

20 Claims, 6 Drawing Sheets

(56) References Cited

U.S. PATENT DOCUMENTS

| | | | |
|---|---|---|---|
| 8,587,912 B2* | 11/2013 | Jezierski | H02H 5/04 361/93.1 |
| 8,755,161 B2 | 6/2014 | James | |
| 9,019,674 B2* | 4/2015 | Mikolajczak | H02H 3/023 361/79 |
| 2002/0027758 A1* | 3/2002 | Oglesbee | H02J 7/0091 361/104 |
| 2003/0202304 A1* | 10/2003 | Canova | H02H 3/025 361/93.1 |
| 2006/0120000 A1* | 6/2006 | Fiesoli | H02H 3/025 361/93.1 |
| 2009/0021874 A1* | 1/2009 | Divito | H02H 3/023 361/57 |

* cited by examiner

PROTECTION DEVICE

FIELD OF THE DISCLOSURE

The present disclosure relates to the field of protection devices and more particularly, but not exclusively, it relates to protection devices for electrical components in electronic systems having improved versatility.

BACKGROUND

Protection devices can be used for protecting electrical components in electronic systems.

Traditionally, mechanical fuses have been used as electrical safety devices to provide protection for downstream circuitry against overcurrent events in electrical circuits. In a mechanical fuse, in the event of an overcurrent event such as a short circuit or overload, a metal wire or metal strip within the fuse device melts and current flowing in the circuit is interrupted. In this manner, the electrical component is not subjected to excess current over a period of time that could cause it to be irreversibly damaged. Depending upon the specific application, a mechanical fuse can be designed to accommodate specific current and voltage ratings, breaking capacity and response time. However, mechanical fuses are sacrificial circuit elements and, once an overcurrent event occurs, must be replaced. Further, the overcurrent level must exceed the current rating of the fuse by an amount that is subject to variation due to manufacturing tolerances, and the response time of the fuse may range from milliseconds to seconds, also due to manufacturing tolerances.

An alternative to mechanical fuses is the circuit breaker, which is an electrical switch that automatically interrupts current flowing in a circuit when an overcurrent event occurs, but which can be reset after the overcurrent event rather than needing to be replaced. However, circuit breakers are usually large devices that are expensive and can be slow, and so they are not suitable for all applications.

Another alternative to mechanical fuses are positive temperature coefficient (PTC) devices, which are electrical components whose resistance increases with increasing temperatures. Examples of PTC devices include resistors and thermistors. However, whilst PTC devices are relatively inexpensive, a disadvantage of using PTC devices as a protection device is that they are slow acting, sensitive to ambient temperature and can dissipate a lot of power.

The mechanical fuse, circuit breaker and PTC device examples that are described above are all discrete protection devices. In recent times, another alternative to mechanical fuses that has started to gain popularity is the electronic fuse (eFuse). Unlike, the mechanical fuse, circuit breaker and PTC devices, the eFuse may be a discrete component or an integrated circuit component that is used to limit current and sometimes voltages during fault conditions. Amongst its many advantages, the eFuse has a low and accurate current rating, a fast response time and is resettable. However, eFuses are sometimes unable to provide adequate protection for applications that require high currents, for example, downstream circuitry that operate at >10 A.

SUMMARY OF THE DISCLOSURE

Therefore, there is a need for improvements in protection devices. In electronic systems, the downstream circuitry may be damaged by overcurrent and overvoltage events. Therefore, there is provided a dual protection device for protecting electrical components in electronic systems. The protection device includes a mechanical fuse in conjunction with an electronic fuse, eFuse, the two components connected in series, together protecting against overcurrent events on two levels. The mechanical fuse provides high overcurrent protection, realising fast and reliable protection at high overcurrent events or in the event of a short circuit failure of the eFuse, and the eFuse provides low overcurrent protection, realising accurate and resettable protection for low overcurrent events.

According to a first aspect of the disclosure, there is provided a protection device for protecting an electrical component in an electrical circuit, the protection device comprising: a mechanical fuse; and an electronic fuse, eFuse, arranged in series with the mechanical fuse, wherein the mechanical fuse is configured to interrupt current flow above a first predetermined (e.g., specified) overcurrent and the eFuse is configured to interrupt current flow above a second predetermined overcurrent, the first predetermined overcurrent being higher than the second predetermined overcurrent.

As such, the first aspect of the disclosure not only provides fast and reliable interruption of current above the first predetermined level by the mechanical fuse but also accurate interruption of current above the second predetermined level by the eFuse. By "interrupting current", it is meant that current may be limited or removed.

In some respects, since the first predetermined overcurrent is higher than the second predetermined overcurrent, the eFuse may also be regarded as providing protection for the mechanical fuse. In theory the eFuse should protect the mechanical fuse during normal operation. However, if the eFuse develops a fault, then the mechanical fuse acts as another reliable protection device, thus preventing high overcurrents which could cause a safety hazard downstream.

The eFuse is a resettable component and so this allows the protection device to also be resettable if an overcurrent event between the second predetermined overcurrent and first predetermined overcurrent; unless a major overcurrent event that exceeds the first predetermined overcurrent occurs, the protection device can be reset since only the eFuse is activated and not the mechanical fuse.

In the mechanical fuse, a sacrificial element such as metal wire or metal strip is provided. When current flow exceeds the first predetermined overcurrent, the metal wire or metal strip melts and thus interrupts current flow. In order to reduce the need to overdesign the mechanical fuse, an eFuse is arranged in series with the mechanical fuse.

In the eFuse, an integrated electronic switch such as a field effect transistor (FET) or a bipolar junction transistor is provided to limit or remove current applied to the electrical component. A sense resistor may be used to measure the current in the system. The sense resistor may be internal or external to the eFuse, but internal may be preferable. An external current setting resistor may set the overcurrent level of the eFuse, i.e. the second predetermined overcurrent of the protection device. The external current setting resistor may be used to set an accurate overcurrent level of the eFuse, for example, of ±15%.

Thus, the eFuse preferably comprises an internal sense resistor, an electronic switch for interrupting current flow and an external current setting resistor for defining the second predetermined overcurrent. The eFuse also preferably comprises an enable pin for enabling or disabling an output of the eFuse, and wherein preferably the eFuse further comprises a fault pin, the enable pin being tied directly to the fault pin.

When the second predetermined overcurrent, i.e. the overcurrent level of the eFuse, is exceeded, an internal timer may start and if the fault duration exceeds a blanking time duration, the output of the eFuse is disconnected. The blanking time may be 100 µs, preferably 20 µs, and more preferably 10 µs. Preferably, if the fault current exceeds double the second predetermined overcurrent of the eFuse, then the fault may be considered to be a short circuit and the output may be disconnected immediately without waiting for the blanking time duration. Preferably, the eFuse comprises an enable pin that is tied directly to a fault pin, thus allowing an auto-retry scheme. Otherwise the eFuse latches off by default when an overcurrent event occurs.

In some examples, the eFuse may also comprise a thermal shutdown feature to ensure that the eFuse is protected from damage when the temperature of the integrated electronic switch exceeds a predetermined value.

Preferably, the protection device is for protecting a power supply rail of a power supply unit or for protecting downstream circuitry. In the case where the protection device is for protecting a power supply rail of a power supply unit, the eFuse may comprises an input voltage pin and a ground pin, and the ground pin of the eFuse may be connected to a ground rail of the power supply unit.

Importantly, the first and second predetermined overcurrent, in particular the second predetermined overcurrent of the eFuse, may be set very accurately. The first and second predetermined overcurrents may be any suitable value, these threshold levels depending upon the application of the protection device. For example, the first predetermined overcurrent may be 10 A or less, preferably 1.5 A or less, more preferably 200 mA or less, and yet more preferably 150 mA or less, and/or the second predetermined overcurrent may be 2 A or less, preferably 1 A or less, more preferably 100 mA or less, and yet more preferably 20 mA or less.

In an example of the first aspect of the disclosure, the first predetermined overcurrent may be 10 A and/or the second predetermined overcurrent may be 2 A. The second predetermined overcurrent may be the same as the current rating of the electronic circuit.

In another example of the first aspect of the disclosure, the first predetermined overcurrent may be 1.5 A and/or the second predetermined overcurrent may be 1 A. Again, the second predetermined overcurrent may be the same as the current rating of the electronic circuit.

In yet another example of the first aspect of the disclosure, the first predetermined overcurrent may be 200 mA and/or the second predetermined overcurrent may be 20 mA. Yet again, the second predetermined overcurrent may be the same as the current rating of the electronic circuit.

In yet another example of the first aspect of the disclosure, the first predetermined overcurrent may be 150 mA and/or the second predetermined overcurrent may be 100 mA. Yet again, the second predetermined overcurrent may be the same as the current rating of the electronic circuit.

The first predetermined overcurrent of the mechanical fuse may be set to a higher level than the second predetermined overcurrent of the eFuse since the accuracy on the mechanical fuse threshold is typically poor compared with that of the eFuse. Because of the relative poor accuracy, the mechanical fuse could either blow too early (false positive failure) or blow too late and lead to damage of the downstream circuitry, for example. For this reason, the mechanical fuse on its own would have to be overdesigned to take this into account. Having an eFuse in the claimed protection device allows for a more efficient design, where the mechanical fuse may only be considered for catastrophic failures, e.g. in an intrinsically safe design where multiple failure modes need to be considered.

In some preferred examples of the first aspect of the disclosure, the protection device may further comprise means for preventing overvoltage as well as overcurrent. In order to achieve this, the eFuse may comprise an overvoltage pin arranged between two resistors of a voltage divider. Alternatively, the protection device may further comprise a Zener diode arranged in parallel with the mechanical fuse and the eFuse. The Zener diode may be arranged downstream of the mechanical fuse and the eFuse.

Advantageously, the Zener diode can shunt a large current to ground when it detects an overvoltage event, thus triggering an overcurrent event in the eFuse and causing it to interrupt current flow very quickly by disconnecting its output from its power source.

According to a second aspect of the disclosure, there is provided a method of protecting an electrical component in an electrical circuit by a protection device, the protection device comprising a mechanical fuse and an electronic fuse, eFuse, arranged in series with the mechanical fuse, wherein the method comprises:

interrupting current flow by the mechanical fuse when a first predetermined overcurrent is exceeded; or interrupting current flow by the eFuse when a second predetermined overcurrent is exceeded, the second predetermined overcurrent being lower than the first predetermined overcurrent.

The method may further comprises using an external current setting resistor of the eFuse to define the second predetermined overcurrent.

In some examples, the method may further comprise allowing an overcurrent to flow for a blanking time by the eFuse when the second predetermined overcurrent is exceeded between one and two times and then disconnecting an output of the eFuse, and/or disconnecting the output of the eFuse quickly without any blanking time when the second predetermined overcurrent is exceeded by over two times.

The method may further comprise preventing overvoltage in the electrical circuit. In some examples, preventing overvoltage in the electrical circuit may comprise activating an overvoltage pin of the eFuse that is connected between two resistors of a voltage divider when an overvoltage is sensed. In other examples, preventing overvoltage in the electrical circuit may comprise shunting current to ground when an overvoltage is sensed by a Zener diode in parallel with the mechanical fuse and the eFuse.

According to a third aspect of the disclosure, there is provided a method of protecting an electrical component in an electrical circuit, the method comprising: arranging an electronic fuse, eFuse, in series with a mechanical fuse; defining a first predetermined overcurrent above which the mechanical fuse is configured to interrupt current flow; and defining a second predetermined overcurrent above which the eFuse is configured to interrupt current flow, the second predetermined overcurrent being lower than the first predetermined overcurrent.

According to a fourth aspect of the disclosure, there is provided use of an eFuse for protecting a mechanical fuse in an electrical circuit, wherein the mechanical fuse is configured to interrupt current flow above a first predetermined overcurrent and the eFuse is configured to interrupt current flow above a second predetermined overcurrent, the first predetermined overcurrent being higher than the second predetermined overcurrent.

Particular advantages of using an eFuse for protecting a mechanical fuse over a current limiting resistor include reduced power dissipation and reduced voltage drop. Further, the eFuse may be programmable to a very high degree of accuracy and also offers versatility because it is reprogrammable at different second predetermined overcurrents, whereas a current limiting resistor is not reprogrammable.

BRIEF DESCRIPTION OF THE DRAWINGS

Examples of the present disclosure will now be described, by non-limiting example only, with reference to the accompanying drawings, in which.

DETAILED DESCRIPTION

It has been recognised that a more versatile protection device that offers both accuracy and reliability is desired.

In the present disclosure, improvements to the accuracy of a protection device are made compared to a traditional mechanical fuse by combining the benefits of using an eFuse with the benefits of using a traditional mechanical fuse.

Importantly, two levels of protection are provided so the protection device of the present disclosure provides both fast and reliable interruption of current above a first predetermined (e.g., specified) level by a mechanical fuse and also accurate interruption of current above a second predetermined level by an eFuse.

Using the above technique of the present disclosure, the eFuse may also provide protection for the mechanical fuse. The eFuse is a resettable component. This allows the protection device to also be resettable if an overcurrent event occurs between the second predetermined overcurrent and first predetermined overcurrent. Unless a major overcurrent event that exceeds the first predetermined overcurrent occurs, the protection device can be reset since the eFuse is triggered to interrupt current flow but the mechanical fuse is not blown.

Figure 1:
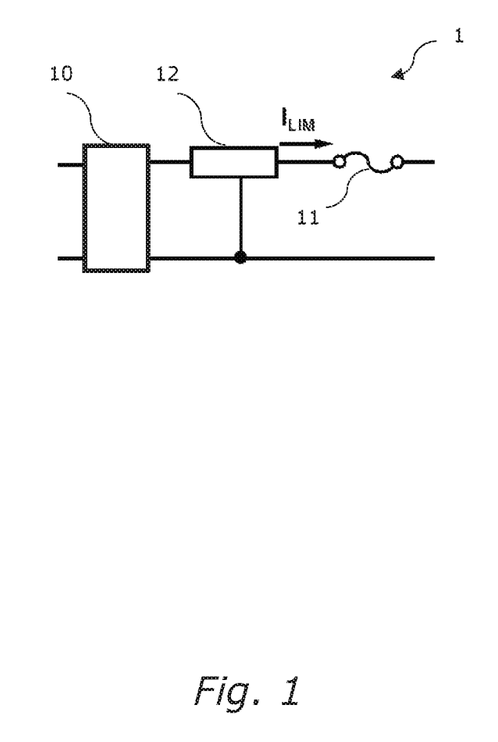
FIG. 1 is a circuit diagram showing a protection device for an electrical component in accordance with a first example of the present disclosure.

FIG. 1 is a circuit diagram showing a protection device 1 for a power supply rail of a power supply unit 10 in accordance with a first example of the present disclosure. In FIG. 1, discrete protection for power supply rails is provided using a mechanical fuse 11 and an eFuse 12 arranged in series with the mechanical fuse 11. The mechanical fuse 11 is configured to interrupt current flow above a first predetermined overcurrent and the eFuse 12 is configured to interrupt current flow above a second predetermined overcurrent, the first predetermined overcurrent being higher than the second predetermined overcurrent.

In the example of FIG. 1, the power supply rail is well-controlled in that there is no risk of an overvoltage event since this is already taken care of at or before the power supply unit.

Although it may be possible to use another type of current limiting device in place of the eFuse 12, a particular advantage of using an eFuse lies in the fact that the eFuse has low power dissipation characteristics and a lower voltage drop than, say, a current limiting resistor. The eFuse may also allow for the capability to auto-retry and latch off following an overcurrent event.

In the example of FIG. 1, the electronic circuit has a current rating of 100 mA and the mechanical fuse has a blow current of 150 mA. Thus, the first predetermined overcurrent of the protection device 1 is set at 150 mA and the second predetermined overcurrent of the protection device 1 is set at 100 mA. However, in other examples of the present disclosure, other first and second predetermined overcurrents may be used.

Figure 2:
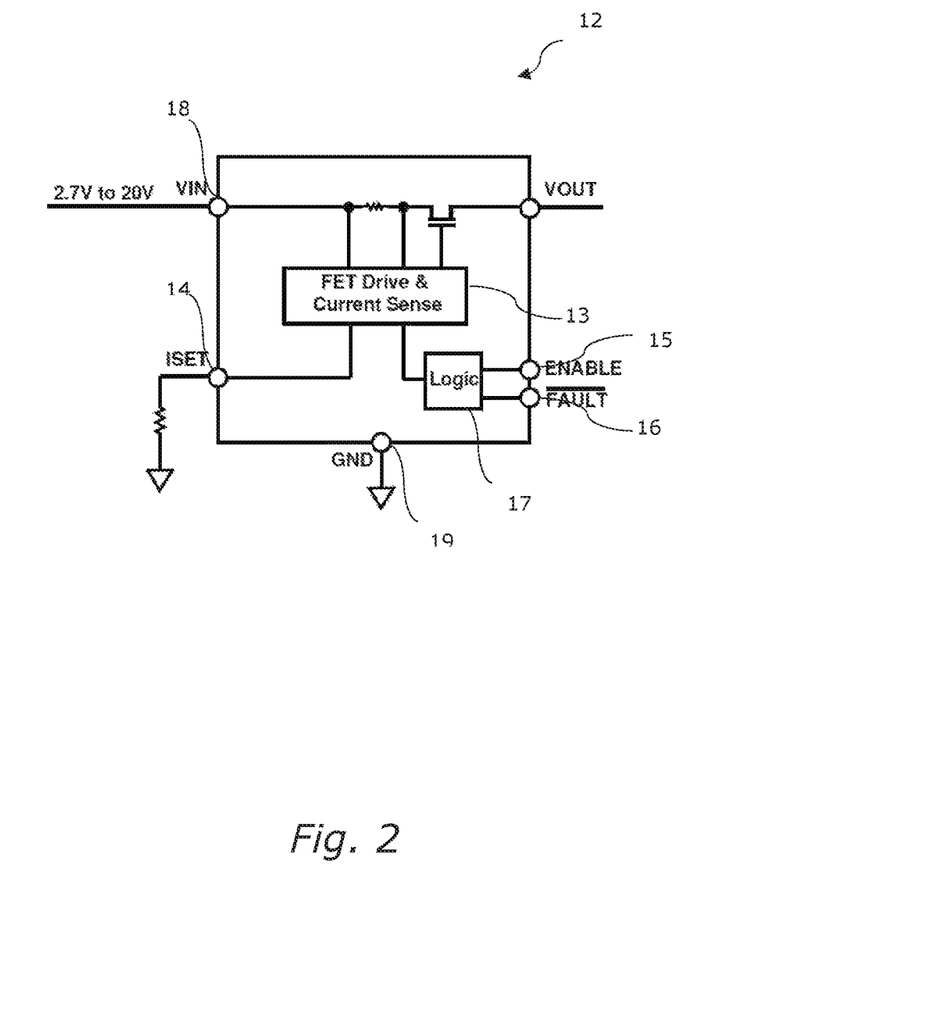
FIG. 2 is a block diagram of an eFuse of the type that may be used in the first example protection device of FIG. 1.

An eFuse 12 that is suitable for use in the protection device 1 of FIG. 1 is shown in the block diagram of FIG. 2 in more detail. In the eFuse, an integrated field effect transistor (FET) drive and current sense unit 13 is provided to limit or remove current applied to an electrical component. An external current setting resistor sits on the $I_{SET}$ pin 14 and is set at a value to determine the overcurrent level of the eFuse, i.e. the second predetermined overcurrent of the protection device, for example, at between 20 mA and 200 mA. The external current setting resistor may be used to set an accurate overcurrent level of the eFuse, for example, of ±15%.

In FIG. 2, there is also shown an enable pin 15 for enabling or disabling the output. It may be tied directly to the fault pin 16 to configure an auto-retry scheme. The eFuse can alternatively latch-off by default when an overcurrent event occurs. There is also shown a logic unit 17 that takes the enable pin 15 as input and controls the fault pin 16.

The eFuse 12 of FIG. 2 has an input voltage pin 18 that can operate between 2.7V and 20V and a ground pin 19. The configuration of the eFuse 12 advantageously results in a resettable device that has less than 50 mV drop in normal operation and fast shutdown (<2 μs) in case of a short circuit condition.

Figure 3A:
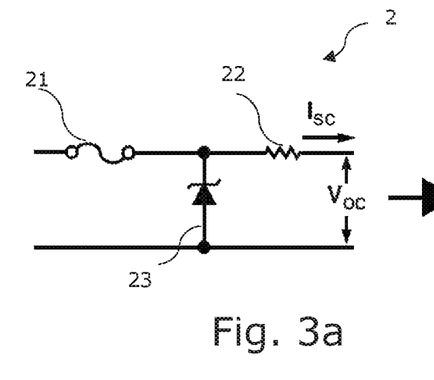
FIGS. 3a and 3b are circuit diagrams showing a protection device for an electrical component in accordance with a comparative example to a second example of the present disclosure and in accordance with the second example of the present disclosure, respectively.
Figure 3B:
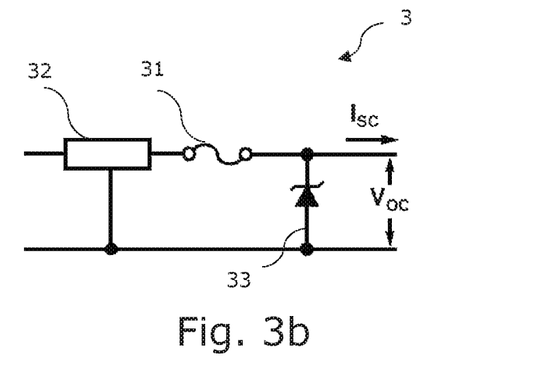
Figure 4A:
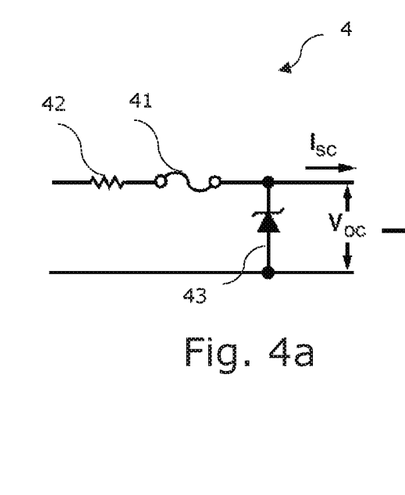
FIGS. 4a and 4b are circuit diagrams showing a protection device for an electrical component in accordance with another comparative example to a third example of the present disclosure and in accordance with the third example of the present disclosure, respectively.
Figure 4B:
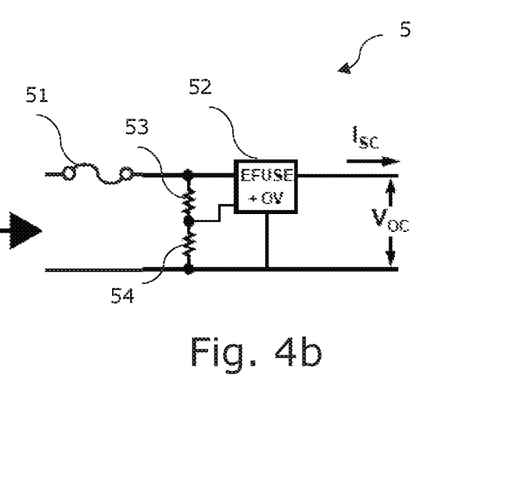
Figure 5A:
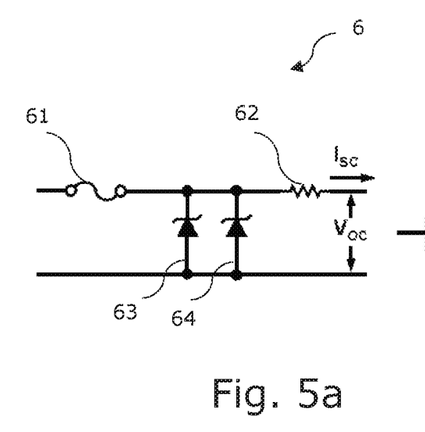
FIGS. 5a and 5b are circuit diagrams showing a protection device for an electrical component in accordance with yet another comparative example to a fourth example of the present disclosure and in accordance with the fourth example of the present disclosure, respectively.
Figure 5B:
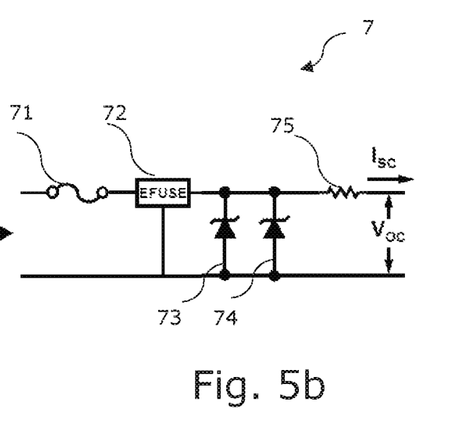

Now turning to FIGS. 3b, 4b, and 5b, implementations of the present disclosure in electrical circuits in which an overvoltage event is possible are discussed.

FIG. 3b is a circuit diagram showing a protection device 3 in accordance with a second example of the present disclosure. In FIG. 3b, protection for downstream circuitry is provided using a mechanical fuse 31, an eFuse 32 arranged in series with the mechanical fuse 31, and a Zener diode 33 arranged between the output of the mechanical fuse and the return. In an overcurrent event, the eFuse allows the overcurrent to flow for a blanking time of 20 μs, before disconnecting its output from its power supply. In an overvoltage event, the Zener diode 33 shunts a large current to ground, triggering a severe overcurrent event above two times the second predetermined overcurrent in the eFuse 32 and causing the eFuse 32 to be shut down very quickly by disconnecting its output from its power supply.

The protection device 3 of FIG. 3b offers improvements over the comparative protection device 2 of FIG. 3a, which has a current limiting resistor 22 instead of an eFuse for limiting current to a load during an overcurrent event. The Zener diode 23 of protection device 2 provides overvoltage protection, but if the overvoltage event persists, then the fuse 21 is blown before power dissipation of the Zener diode 23 becomes excessive. In contrast, the eFuse 32 of protection device 3 offers protection for the mechanical fuse 31 as well as the load in the event of an overvoltage.

FIG. 4b is a circuit diagram showing a protection device 5 in accordance with a third example of the present disclosure. In FIG. 4b, protection for downstream circuitry is provided using a mechanical fuse 51, an eFuse 52 arranged in series with the mechanical fuse 51, the eFuse 52 having an overvoltage pin connected between two resistors 53, 54, of a voltage divider. In an overcurrent event, the eFuse allows the overcurrent to flow for a blanking time of 10 μs, before disconnecting its output from its power supply. In an overvoltage event, the overvoltage pin of the eFuse 52 triggers an overvoltage event and causes the eFuse 32 to be shut down very quickly by disconnecting its output from its power supply.

The protection device 5 of FIG. 4b offers improvements over the comparative protection device 4 of FIG. 4a, which has a current limiting resistor 42 instead of an eFuse for limiting current to a load during an overcurrent event. The current limiting resistor 42 also limits power dissipation in the Zener diode 43 during an overvoltage event since the current limiting resistor is placed before the Zener diode 43. However, the current limiting resistor 42 will only protect the Zener diode 43 during an overvoltage event, in particular a DC overvoltage event, then the fuse 41 will still blow. In contrast, the eFuse 52 of protection device 5 offers protection for the mechanical fuse 51 as well as the load in the event of an overvoltage.

It will be appreciated that the overvoltage pin of eFuse 52 of protection device 5 and the Zener diode 33 of protection device 3 may be used interchangeably to provide overvoltage protection. If, for example, a Zener diode were used in the protection device 5 of FIG. 4b, then that Zener diode may be much smaller than the Zener diode 23 of the comparative protection device 2 since the eFuse 52 regulates power dissipation in the Zener diode, but the overvoltage event will not be regulated in this case.

FIG. 5b is a circuit diagram showing a protection device 7 in accordance with a fourth example of the present disclosure. Protection device 7 comprises a mechanical fuse 71, an eFuse 72 arranged in series with the mechanical fuse 71, two Zener diodes 73, 74 arranged in parallel with the mechanical fuse 71 and the eFuse 72, and a current limiting resistor 75 arrange in series with the mechanical fuse 71 and the eFuse 72. The purpose of the second Zener diode is to act as a safety backup in the event that the first Zener diode fails.

In FIG. 5b, an eFuse 72 is added to an intrinsic safe design protection device 6 of FIG. 5a. The eFuse 72 is used to prevent the mechanical fuse 71 from blowing during an overvoltage event. This provides the advantage of avoiding the need to repair the protection device 7, which may be a costly process, because the eFuse 72 may be reset and reused. Put another way, the mechanical fuse 71 may be considered to act as a safety backup in the event of eFuse 72 failure.

Figure 6:
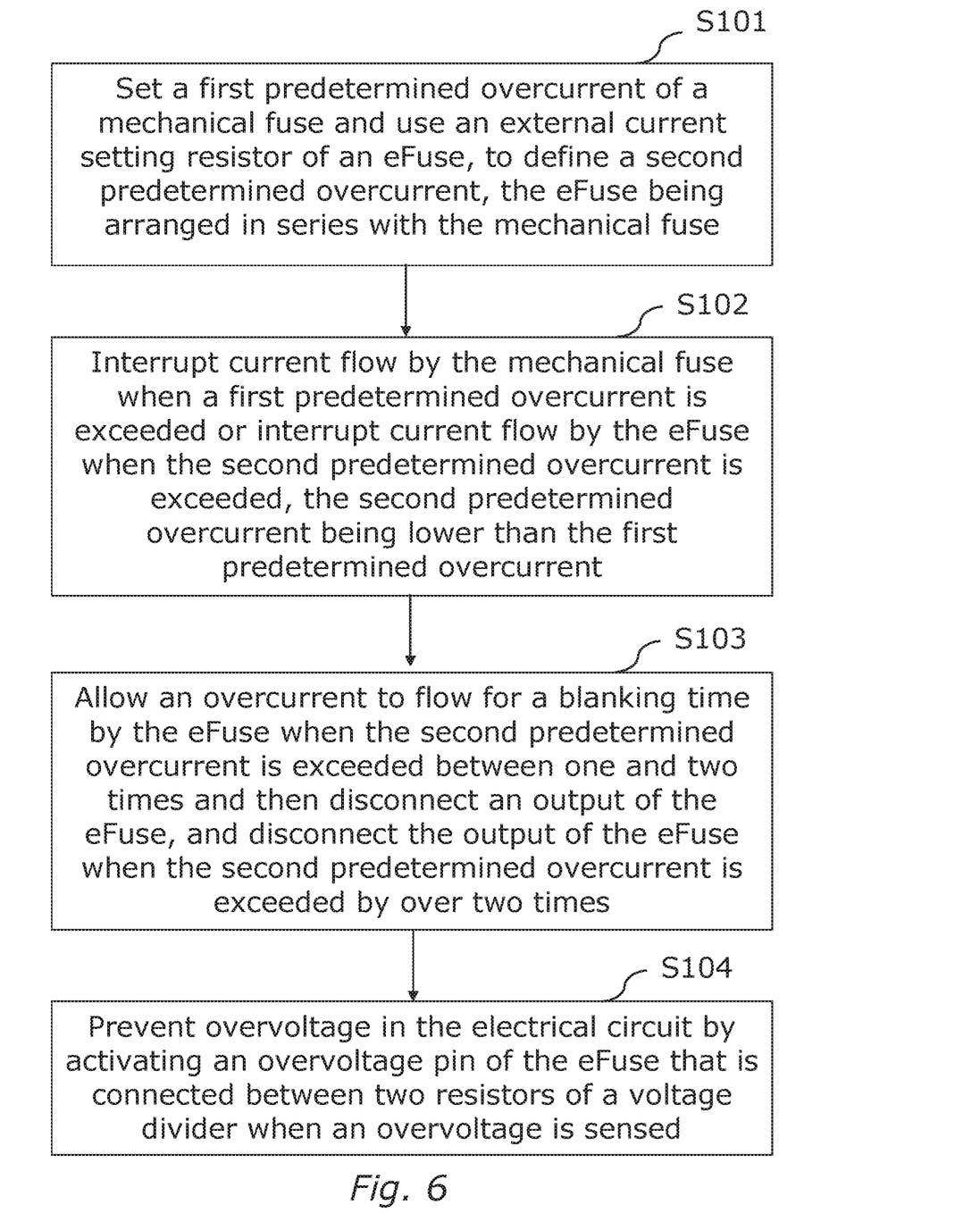
FIG. 6 is a flow chart that illustrates a method in accordance with a fifth example of the present disclosure.

FIG. 6 is a flow chart that illustrates a method in accordance with a fifth example of the present disclosure.

At step S101, a first predetermined overcurrent of a mechanical fuse is set and an external current setting resistor of an eFuse is used to define a second predetermined overcurrent, the eFuse being arranged in series with a mechanical fuse.

At step S102, current flow is interrupted by the mechanical fuse when a first predetermined overcurrent is exceeded or current flow is interrupted by the eFuse when the second predetermined overcurrent is exceeded, the second predetermined overcurrent being lower than the first predetermined overcurrent.

At step S103, an overcurrent is allowed to flow for a blanking time by the eFuse when the second predetermined overcurrent is exceeded between one and two times and then an output of the eFuse is disconnected. The output of the eFuse is disconnected at the outset when the second predetermined overcurrent is exceeded by over two times.

At step S104, overvoltage in the electrical circuit is prevented by activating an overvoltage pin of the eFuse that is connected between two resistors of a voltage divider when an overvoltage is sensed. In another example of the disclosure, overvoltage in the electrical circuit is prevented by shunting current to ground when an overvoltage is sensed by a Zener diode in parallel with the mechanical fuse and the eFuse.

The above description relates to particularly preferred aspects of the disclosure, but it will be appreciated that other implementations are possible. Variations and modifications will be apparent to the skilled person, such as equivalent and other features which are already known and which may be used instead of, or in addition to, features described herein. Features that are described in the context of separate aspects or examples may be provided in combination in a single aspect or example. Conversely, features which are described in the context of a single aspect or example may also be provided separately or in any suitable sub-combination.

The invention claimed is:

1. A protection device for protecting an electrical component in an electrical circuit, the protection device comprising:
   a mechanical fuse configured to interrupt current flow above a first predetermined overcurrent; and
   an electronic fuse, ("eFuse"), arranged in series with the mechanical fuse, and configured to interrupt current flow after waiting for a blanking period in response to the current flow exceeding a second predetermined overcurrent, and configured to interrupt current flow without waiting for the blanking period in response to the current flow exceeding a third predetermined overcurrent; and
   wherein the second predetermined overcurrent is less than the third predetermined overcurrent, and wherein the third predetermined overcurrent is less than the first predetermined overcurrent.

2. The protection device according to claim 1, wherein the protection device is configured for protecting a power supply rail of a power supply unit.

3. The protection device according to claim 2, wherein the eFuse comprises an input voltage pin and a ground pin, and wherein the ground pin of the eFuse is connected to a ground rail of the power supply unit.

4. The protection device according to claim 1, wherein the protection device is configured for protecting downstream circuitry.

5. The protection device according to any preceding claim, wherein the eFuse comprises an integrated sense resistor for measuring current flow.

6. The protection device according to claim 1, wherein the eFuse comprises an integrated electronic switch for interrupting current flow.

7. The protection device according to claim 1, wherein the eFuse comprises an external current setting resistor for defining the second predetermined overcurrent.

8. The protection device according to claim 1, wherein the eFuse comprises an enable pin for enabling or disabling an output of the eFuse.

9. The protection device according to claim 8, wherein the eFuse further comprises a fault pin.

10. The protection device according to claim 1, wherein the protection device further comprises means for preventing overvoltage in the electrical circuit.

11. The protection device according to claim 10, wherein eFuse comprises an overvoltage pin arranged between two resistors of a voltage divider.

12. The protection device according to claim 10, wherein the protection device further comprises a Zener diode arranged in parallel with the mechanical fuse and the eFuse.

13. The protection device according to claim 1, wherein the first predetermined overcurrent is 10 A or less.

14. The protection device according to claim 1, wherein the second predetermined overcurrent is 2 A or less.

15. The protection device according to claim 1, wherein the blanking time is less than 100 µs.

16. A method of protecting an electrical component in an electrical circuit by a protection device, the protection device comprising a mechanical fuse and an electronic fuse, ("eFuse"), arranged in series with the mechanical fuse, wherein the method comprises:
   providing different first, second, and third predetermined overcurrent levels, wherein the second predetermined overcurrent is less than the third predetermined overcurrent, and wherein the third predetermined overcurrent is less than the first predetermined overcurrent; and
   performing at least one of:
   in response to the second predetermined overcurrent being exceeded, current flow is interrupted by the eFuse after waiting for a blanking period;
   in response to the third predetermined overcurrent being exceeded, the current flow is interrupted by the eFuse without waiting for the blanking period; or
   in response to the first predetermined overcurrent being exceeded, the current flow is interrupted by the mechanical fuse.

17. The method according to claim 16, wherein the method further comprises using an external current setting resistor of the eFuse to define the second predetermined overcurrent.

18. The method according to claim 16, wherein preventing overvoltage in the electrical circuit comprises activating an overvoltage pin of the eFuse that is connected between two resistors of a voltage divider in response to an overvoltage is sensed.

19. The method according to claim 16, wherein preventing overvoltage in the electrical circuit comprises shunting current to ground in response to an overvoltage is sensed by a Zener diode in parallel with the mechanical fuse and the eFuse.

20. Use of an electronic fuse, ("eFuse"), for protecting a mechanical fuse in an electrical circuit;
   wherein the eFuse is arranged in series with the mechanical fuse;
   wherein the mechanical fuse is configured to interrupt current flow above a first predetermined overcurrent, the eFuse is configured to interrupt current flow after waiting a blanking period when the current flow is above a second predetermined overcurrent, and the eFuse is configured to interrupt current flow without waiting for the blanking period when the current flow is above a third predetermined overcurrent;
   wherein the third predetermined overcurrent being higher than the second predetermined overcurrent, and the first predetermined overcurrent being higher than either the second predetermined overcurrent or the third predetermined overcurrent; and
   wherein the eFuse output is user enabled or disabled by an enable pin.

* * * * *